United States Patent
Rodriguez-Serrano et al.

(10) Patent No.: US 9,384,423 B2
(45) Date of Patent: Jul. 5, 2016

(54) SYSTEM AND METHOD FOR OCR OUTPUT VERIFICATION

(71) Applicant: Xerox Corporation, Norwalk, CT (US)

(72) Inventors: Jose Antonio Rodriguez-Serrano, Grenoble (FR); Florent C. Perronnin, Domene (FR)

(73) Assignee: XEROX CORPORATION, Norwalk, CT (US)

( * ) Notice: Subject to any disclaimer, the term of this patent is extended or adjusted under 35 U.S.C. 154(b) by 453 days.

(21) Appl. No.: 13/903,218

(22) Filed: May 28, 2013

(65) Prior Publication Data

US 2014/0355835 A1  Dec. 4, 2014

(51) Int. Cl.
*G06K 9/00* (2006.01)
*G06K 9/72* (2006.01)
*G06K 9/32* (2006.01)
*G06K 9/62* (2006.01)

(52) U.S. Cl.
CPC .............. *G06K 9/72* (2013.01); *G06K 9/00872* (2013.01); *G06K 9/3258* (2013.01); *G06K 9/6232* (2013.01); *G06K 2209/15* (2013.01)

(58) Field of Classification Search
CPC ............ G06F 17/30253; G06K 2209/15; G06K 9/3258; G06K 9/00456
See application file for complete search history.

(56) References Cited

U.S. PATENT DOCUMENTS

| | | | |
|---|---|---|---|
| 5,774,588 A * | 6/1998 | Li | G06F 17/273 382/229 |
| 5,805,747 A * | 9/1998 | Bradford | G06K 9/6292 382/185 |
| 7,394,938 B2 * | 7/2008 | Erol | G06F 17/30256 382/218 |
| 2003/0021481 A1 | 1/2003 | Kasutani | |
| 2005/0147302 A1 * | 7/2005 | Leung | G06K 9/4685 382/190 |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0228469 A1 * | 9/2008 | Ross | G06F 17/30592 704/10 |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2009/0208118 A1 | 8/2009 | Csurka | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |

(Continued)

OTHER PUBLICATIONS

Li et al., Validation of Image Defect Models for Optical Character Recognition, 1996, IEEE Transactions on Pattern Analysis and Machine Intelligence, vol. 18, No. 2, pp. 99-108.*

(Continued)

*Primary Examiner* — Stephen R Koziol
*Assistant Examiner* — Jonathan S Lee
(74) *Attorney, Agent, or Firm* — Fay Sharpe LLP

(57) ABSTRACT

A system and method for computing confidence in an output of a text recognition system includes performing character recognition on an input text image with a text recognition system to generate a candidate string of characters. A first representation is generated, based on the candidate string of characters, and a second representation is generated based on the input text image. A confidence in the candidate string of characters is computed based on a computed similarity between the first and second representations in a common embedding space.

22 Claims, 8 Drawing Sheets

(56) References Cited

U.S. PATENT DOCUMENTS

| | | | |
|---|---|---|---|
| 2010/0191743 A1 | 7/2010 | Perronnin et al. | |
| 2010/0226564 A1 | 9/2010 | Marchesotti et al. | |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |
| 2011/0091105 A1 | 4/2011 | Perronnin et al. | |
| 2011/0137898 A1 | 6/2011 | Gordo et al. | |
| 2011/0189450 A1 | 8/2011 | Hoshi et al. | |
| 2011/0194733 A1* | 8/2011 | Wilson | G06K 9/00785 382/105 |
| 2012/0045134 A1 | 2/2012 | Perronnin et al. | |
| 2012/0070073 A1 | 3/2012 | Kompalli et al. | |
| 2012/0076401 A1 | 3/2012 | Sanchez et al. | |
| 2012/0143853 A1 | 6/2012 | Gordo et al. | |
| 2012/0158739 A1 | 6/2012 | Ah-Pine et al. | |
| 2012/0263352 A1* | 10/2012 | Fan | G06K 9/3258 382/105 |
| 2013/0060786 A1 | 3/2013 | Serrano et al. | |
| 2013/0129151 A1 | 5/2013 | Serrano et al. | |
| 2013/0129152 A1 | 5/2013 | Serrano et al. | |

OTHER PUBLICATIONS

Gordo, et al., "Leveraging category-level labels for instance-level image retrieval," Computer Vision and Pattern Recognition (CVPR) pp. 3045-3052 (2012).

Anagnostopoulos, et al. "License plate recognition from still images and video sequences: A survey" IEEE Trans. on Intelligent Transportation Systems, vol. 9, No. 3, 2008, pp. 377-391.

Perronnin, et al. "Improving the Fisher kernel for large-scale image classification" ECCV, Part IV, 2010, pp. 143-156.

Alves, et al. "Text localization in scene images by morphological filters" SIBGRAPI, 2009, pp. 1-2.

Nguyen, et al. "Tensor voting based text localization in natural scene images" IEEE Signal Processing Letters, vol. 17, No. 7, Jul. 17, 2010, pp. 639-642.

Comelli, et al. "Optical recognition of motor vehicle license plates" IEEE Trans. on VT, vol. 44, No. 4, Nov. 1995, pp. 790-799.

Epshtein, et al. "Detecting text in natural scenes with stroke width transform" CVPR, 2010, pp. 2963-2970.

Perronnin, et al. "Fisher kernels on visual vocabularies for image categorization" CVPR 2007, pp. 1-8.

Csurka, et al. "Visual Categorization with bags of keypoints" ECCV Workshop, 2004, vol. 1, pp. 1-16.

Sanchez, et al. "High-dimensional signature compression for large-scale image classification" CVPR 2011, pp. 1665-1672.

Lazebnik, et al. "Beyond bags of features: Spatial pyramid matching for recognizing natural scene categories" CVPR 2006, Proc. 2006 IEEE Computer Society Conf. on Computer Vision and Pattern Recognition, vol. 2, pp. 2169-2178.

Lowe. "Distinctive image features from scale-invariant keypoints" IJCV, vol. 60, 2004, pp. 1-28.

Pitrelli, et al. "Confidence Modeling for Verification Post-Processing for Handwriting Recognition", Proc. of the Eighth Intl. Workshop on Frontiers in Handwriting Recognition, 2002, pp. 30-35.

U.S. Appl. No. 13/592,961, filed Aug. 23, 2012, Serrano.
U.S. Appl. No. 13/351,038, filed Jan. 16, 2012, Serrano.
U.S. Appl. No. 13/527,228, filed Jun. 19, 2012, Skaff, et al.
U.S. Appl. No. 13/836,310, filed Mar. 15, 2013, Wu, et al.
U.S. Appl. No. 13/757,014, filed Feb. 1, 2013, Serrano, et al.

* cited by examiner

SYSTEM AND METHOD FOR OCR OUTPUT VERIFICATION

BACKGROUND

The exemplary embodiment relates to text recognition in images. It finds particular application in connection with verification of OCR output, such as in recognizing license plates, and will be described with particular reference thereto. However, it is to be appreciated that it is applicable to a wide range of recognition problems.

Optical Character Recognition (OCR) refers to the process of recognizing the text present in an image, i.e. converting the pixels of the image into the actual string of text appearing in the image. There has been considerable work on OCR in the document analysis domain and other application fields such as license plate recognition, where the license plate is generally a unique identifier for the vehicle on which it is mounted. See, for example, Anagnostopoulos, et al., "License plate recognition from still images and video sequences: A survey," IEEE Trans. on Intelligent Transportation Systems, vol. 9, No. 3, pp. 377-391, 2008.

OCR systems typically operate by segmenting a full image into sub-images corresponding to words and then recognizing the word in each individual sub-image. It is this latter stage of processing the sub-image that is the focus of this application. Such a sub-image containing a character string such as a single word is referred to herein as a "text image." In the case of license plates, the sub-image may be a cropped image of a vehicle where the license plate number has been located. The desired output is a text string corresponding to the word or other character string that is present in the text image. However, OCR recognition is not completely accurate for a number of reasons. For example, accuracy diminishes when the visibility at the time of capturing the image is poor. Additionally, there may be characters in the image which are not accepted by the OCR system. In practical applications, therefore, it is common for the OCR system to output a confidence score for the recognized string. The confidence score is a self-assessment by the OCR algorithm of the reliability of the output. The computation of the OCR confidence score depends on the internal recognition process. As one example, for a probabilistic model, it may be the posterior probability of the output text string given the image data. For a system based on individual character detection and classification, it may be the arithmetic or geometric average of the individual character classification scores.

In some applications of OCR such as in license plate recognition, an OCR error may carry a high cost (e.g., result in billing an incorrect customer for toll charges). In such an application, the confidence score is used to trigger a "reject" decision, typically by discarding OCR decisions where the confidence is a below a threshold. In case of a rejection, the text image can be sent to a second automatic stage (for example, a second OCR) or to a human annotator for manual review. In practice, the OCR confidence score does not always provide a reliable prediction of whether the OCR output matches the ground truth and thus the confidence score may result in the rejection of OCR decisions that are correct or the acceptance of OCR decisions that are incorrect, depending, in part, on where the threshold is placed. Even in the case where two OCRs are used, since access to the internal mechanics of each OCR system is not generally made available to users, a second OCR may not overcome the deficiencies of the first OCR. Extensive use of human annotators can be costly and time consuming.

There remains a need for a reliable system and method for computing a confidence in the output of a text recognition system which need not rely on access to its internal recognition process.

INCORPORATION BY REFERENCE

The following references, the disclosures of which are incorporated herein by reference in their entireties, are mentioned:

U.S. Pub. No. 20100226564, published on Sep. 9, 2010, entitled FRAMEWORK FOR IMAGE THUMBNAILING BASED ON VISUAL SIMILARITY, by Luca Marchesotti, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. Pub. No. 20130060786, published on Mar. 7, 2013, entitled TEXT-BASED SEARCHING OF IMAGE DATA, by José Antonio Rodriguez Serrano, et al.

U.S. Pub. No. 20130129151, published on May 23, 2013, entitled METHODS AND SYSTEMS FOR IMPROVED LICENSE PLATE SIGNATURE MATCHING BY SIMILARITY LEARNING ON SYNTHETIC IMAGES, by José Antonio Rodriguez Serrano, et al.

U.S. Pub. No. 20130182909, published on Jul. 18, 2013, entitled IMAGE SEGMENTATION BASED ON APPROXIMATION OF SEGMENTATION SIMILARITY, by José Antonio Rodriguez Serrano.

U.S. application Ser. No. 13/458,464, filed on Apr. 27, 2012, entitled METHODS AND SYSTEMS FOR IMPROVING YIELD IN WANTED VEHICLE SEARCHES, by José Antonio Rodriguez Serrano, et al.

U.S. application Ser. No. 13/527,228, filed on Jun. 19, 2012, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.

U.S. application Ser. No. 13/592,961, filed on Aug. 23, 2012, entitled REGION REFOCUSING FOR DATA-DRIVEN OBJECT LOCALIZATION, by José Antonio Rodriguez Serrano.

U.S. application Ser. No. 13/757,014, filed Feb. 1, 2013, entitled LABEL-EMBEDDING FOR TEXT RECOGNITION, by José Antonio Rodriguez Serrano, et al.

U.S. application Ser. No. 13/836,310, filed on Mar. 15, 2013, entitled METHODS AND SYSTEM FOR AUTOMATED IN-FIELD HIERARCHICAL TRAINING OF A VEHICLE DETECTION SYSTEM, by Wencheng Wu, et al.

BRIEF DESCRIPTION

In accordance with one aspect of the exemplary embodiment, a method for computing confidence includes, performing character recognition with a text recognition system on an input text image to generate a candidate string of characters. A first representation is generated based on the candidate string of characters. A second representation is generated based on the input text image. A confidence in the candidate string of characters is computed based on a computed similarity between the first and second representations in a common embedding space. At least one of the first and second representations is projected into this common space.

At least one of the performing character recognition, generating the first representation, generating the second representation, and computing the confidence may be performed with a computer processor.

In accordance with another aspect of the exemplary embodiment, a system for computing confidence includes a text image representation component which generates a text image representation based on features extracted from a text image. A text string representation component receives a character string from an associated text recognition system as a candidate string for the text image and generates a character string representation based on features extracted from the character string. A comparison component computes a confidence in the character string based on a similarity between the text image representation and the character string representation in a learned embedding space. An information output component outputs information based on the computed confidence. A processor implements the text image representation component, text string representation component, comparison component, and information output component.

In accordance with another aspect of the exemplary embodiment, a license plate recognition method includes performing optical character recognition on an image of a license plate to generate a character string as a candidate license plate number, computing a confidence in the candidate license plate number based on a function which embeds a representation of the license plate image and a representation of the candidate license plate number in an embedding space with a matrix of weights learned on an annotated set of license plate images. Where the confidence meets a threshold, the method includes outputting the character string as a recognized license plate number for the image of the license plate. Otherwise another process for license plate number recognition is initiated. At least one of the performing, computing and outputting is performed with a processor.

BRIEF DESCRIPTION OF THE DRAWINGS

FIG. 2 is a functional block diagram of a system for OCR output verification and has been split into two views, where

DETAILED DESCRIPTION

The exemplary embodiment relates to a system and method for computing a confidence measure for the output of a text recognition process, such as an OCR output, given an input text image, and finds particular application in the context of license plate recognition.

Figure 1:
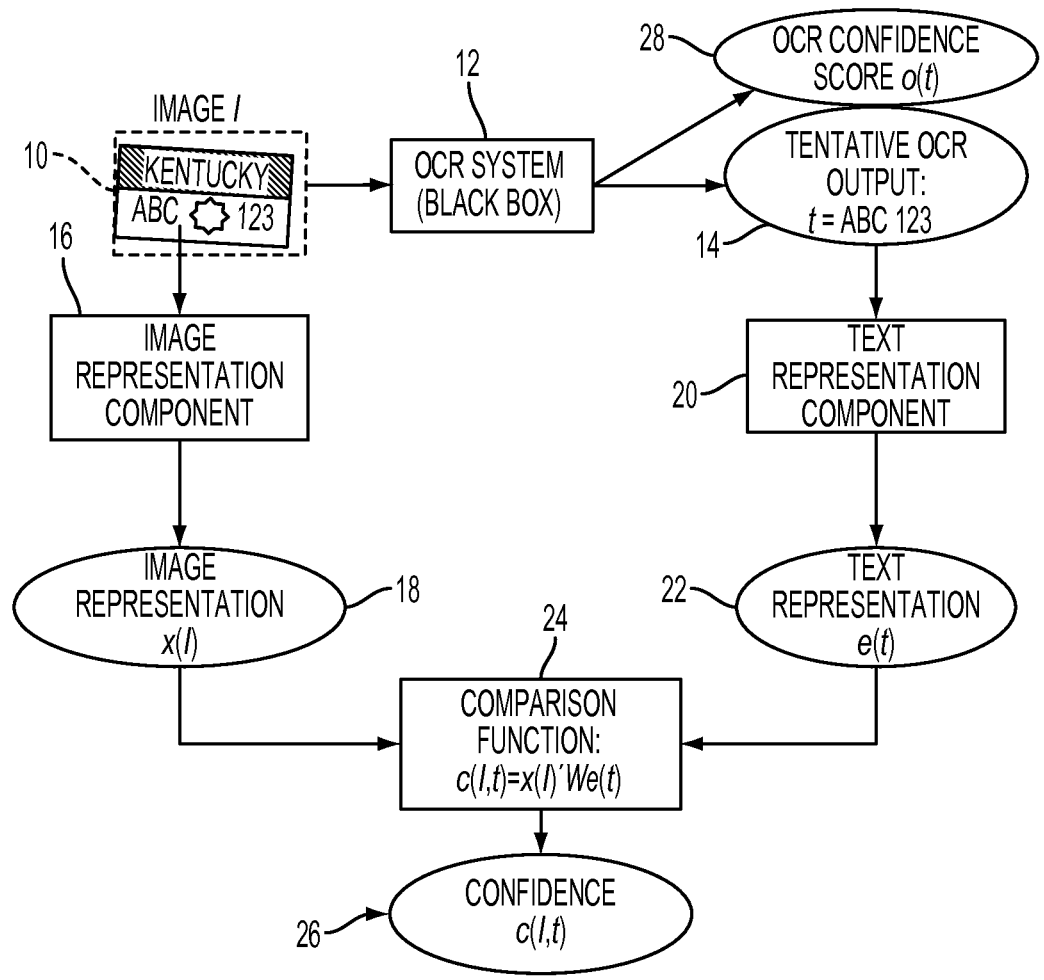
FIG. 1 is an overview of an exemplary system and method for OCR output verification.

FIG. 1 provides an overview of the confidence computation system and process. An input image or "text image" 10 is denoted I. The image 10 may be of a single word, or other short character string, that has been automatically located in a larger image.

Image I is processed by a text recognition component 12, such as a conventional OCR system. The text recognition component 12 can be any suitable system for recognizing text in an image and it can be treated simply as a black box. OCR system 12 outputs OCR output 14, specifically, a candidate text string, denoted t, which consists of a string of characters that are drawn from a predefined alphabet (a finite set of characters).

In the case of license plates, for example, the image 10 may be of a license plate, localized, for example, in a larger image of a vehicle using a license plate detector. The alphabet recognized by the OCR system may be limited to the specific set of characters (e.g., letters and numbers) that are permitted to be used in license plate numbers (sometimes referred to as registration identifiers). Some characters may be ignored, such as spaces and dashes. For example AB 12-34-32 may be recognized and output by the OCR system as the character string AB123432. The license plate number may be a numeric or alphanumeric code that uniquely identifies the vehicle on which it is mounted within the issuing region's database.

As will be appreciated, the license plate number and image of a license plate are exemplary only and are used to illustrate the exemplary embodiment in which a text image is compared to a character string of characters drawn from a predefined, finite vocabulary. In other embodiments, a larger set of ASCII, UNICODE, and/or UTF-8 characters may be used as the alphabet. In text recognition applications, where the object is to recognize a word, the OCR system 12 may output a candidate text string that is found in a predefined vocabulary and automatically reject, as candidates, strings which are absent from the vocabulary. Where a received image includes two or more potential words, each may be processed separately as a text image by the exemplary method. However, this step is generally performed at an earlier stage, by the text detector.

OCR system 12 may also output other non-textual information, such as a font recognized for the character string that is recognized from a predetermined set of fonts. Logos may also be recognized from a stored logo database.

An image representation component 16 computes a representation 18 of the text image I, such as a multidimensional feature vector, which is denoted $x(I)$. A text representation component 20 computes a representation 22 of the text sequence t, such as a multidimensional feature vector, which is denoted $e(t)$. A comparison component 24 computes a confidence measure 26 in the OCR output by applying a comparison function, denoted $c(t,I)$, which computes a comparison measure (e.g., a similarity) between $e(t)$ and $x(I)$. The similarity is computed in a learned, common embedding space in which the similarity between embedded representations $x(I)$ and $e(t)$ of a set of training images is a more reliable predictor of whether the OCR output matches the true label of the text image 10 (e.g., the actual license plate number) than the OCR system itself. In one embodiment, a projection matrix, denoted W, is learned, which projects (maps) the representations $x(I)$ and $e(t)$ into this embedding sub-space. The confidence measure, e.g., in the form of a score, of t on image I, can thus be computed using on a comparison function of the form:

$$c(t,I)=x(I)^T \cdot W \cdot e(t) \tag{1}$$

where $x(I)^T$ denotes the transpose of $x(I)$, and $\cdot$ represents the dot product. Either representation $x(I)$ or $e(t)$ can, of course, be the one transposed.

The projection matrix W can be decomposed into two smaller matrices U and V which are applied to the respective representations $x(I)$ and $e(t)$, where $W=U^T V$. The projection matrix W (or the two separate projection matrices) can be learned via structured learning. In the exemplary embodiment, the comparison between the image and the word is computed as the dot product between the projections of representations x(I) and e(t) when embedded by W in the subspace. However, other similarity metrics are also contemplated. The result of the dot product, when used as a confidence score, is demonstrated in the examples below to be more reliable than the confidence score of the OCR system itself, in the case of an example commercial OCR system.

In one embodiment disclosed herein, the representation 18 of the image is a statistical representation of the image, derived from low-level features extracted from patches the image. As an example, Fisher Vectors can be used to generate a representation of the image. See, for example, Perronnin, et al., "Improving the Fisher kernel for large-scale image classification," in ECCV, 2010. The multidimensional representation x(I) may include at least 100, or at least 1000, or at least 5000 features, or more.

In one embodiment disclosed herein, the representation 22 of the text string 14 is spatial pyramid bag of characters (SPBOC), as described, for example in U.S. application Ser. No. 13/757,014 (the '014 application), incorporated by reference. The multidimensional representation e(t) may include at least 50, or at least 100, or at least 500, or at least 1000 features, or more.

In one embodiment, the projection matrix W is learned using annotated data, as described, for example, in the '014 application and U.S. application Ser. No. 13/592,961 (the '961 application).

The confidence score c(t, I) may be used for a variety of applications:

In one embodiment, the exemplary system and method output the tentative OCR output t as the recognized text string when the confidence score c(t, I) meets or exceeds a predetermined threshold score $T_c$, such as a given score.

In one embodiment, the confidence score c(t, I) replaces a confidence score 28 for t, denoted o(t), that is output by the OCR system 12 itself.

In one embodiment, the confidence score c(t, I) may be used in conjunction with the confidence score 28. For example, if both c(t, I) and o(t) meet or exceed respective thresholds, which can be the same or different, then the tentative text string t is assumed to be correct. In another embodiment, the exemplary verification system is called on only when o(t) does not meet a predetermined threshold score $T_o$.

In one embodiment, the OCR system 12 may output a ranked set of alternative text strings $\{t_1, t_2, \ldots t_n\}$ where an OCR confidence score 28 $\{o(t_1), o(t_2), \ldots o(t_n)\}$ for each output string is used as the basis for the ranking. In this case, the respective confidence scores $c(I,t_1), c(I,t_2), \ldots c(I,t_n)$ may be used to re-rank the most highly ranking text strings $t_1, t_2, \ldots t_n$.

Figure 2A:
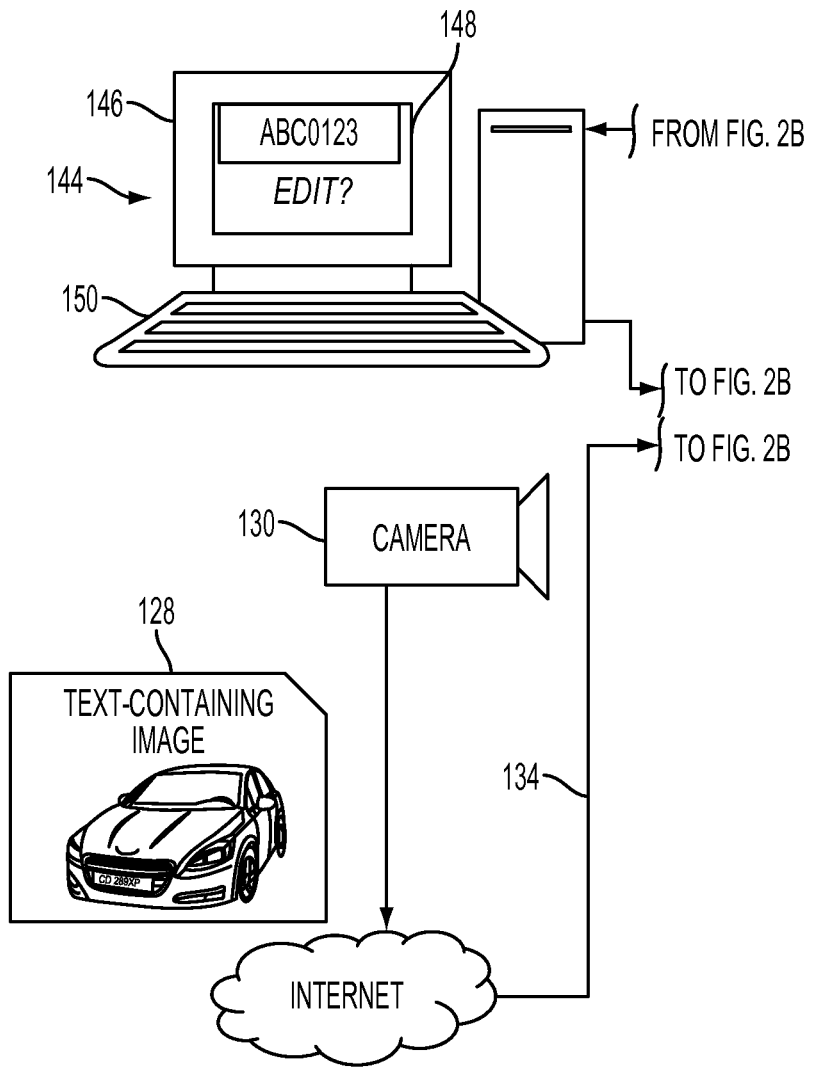
FIG. 2A shows a first part of the system and FIG. 2B shows a second part of the system.
Figure 2B:
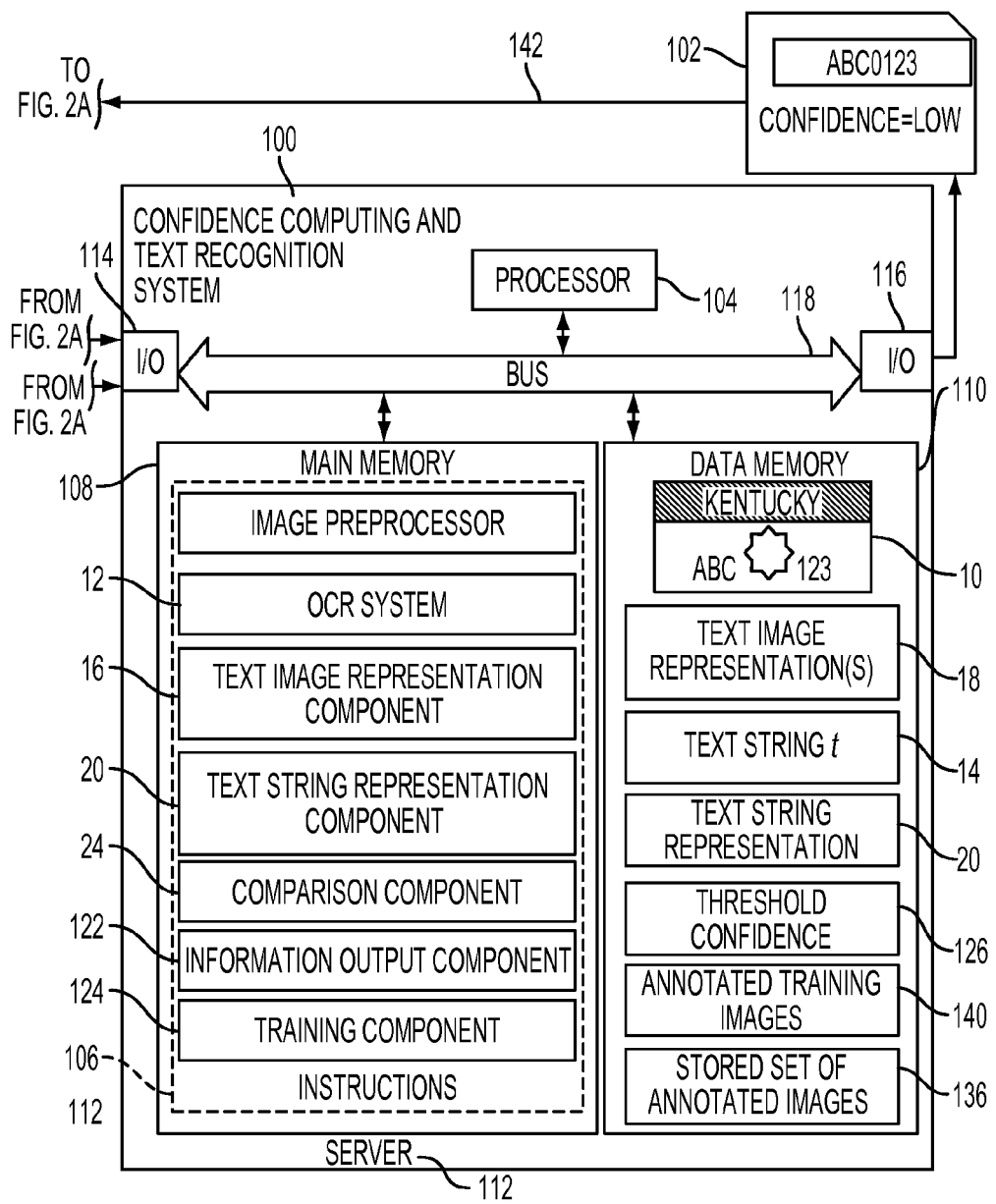

With reference also to FIG. 2 (split into two views, FIG. 2A and FIG. 2B), a functional block diagram of a computer-implemented confidence computing (and text recognition) system 100 which incorporates the components 12, 16, 20, 24 illustrated in FIG. 1, is shown. The computer-implemented system 100 is configured for computing a confidence based on a measure of similarity between a character string 14 such as a license plate number output by a text recognition system 12, and the text image 10, such as an image of a license plate, from which the character string 14 has been generated, by generating representations of the respective string and image in a space which allows a meaningful measure of similarity (and hence confidence) to be computed, and to output information 102 based thereon.

The illustrated computer system 100 includes a processor 104 which executes instructions 106 stored in main memory 108 for performing the method(s) outlined in one or more of FIGS. 3-6. The processor 104 may also control the overall operation of the computer system 100 by execution of processing instructions stored in memory 108. Data may be stored in data memory 110 that is integral with or separate from memory 108 and which may be resident on the same computing device 112, as shown, or on a remote computing device. One or more input/output (I/O) devices 114, 116 allow the system to communicate with external devices. Hardware components 104, 108, 110, 114, 116 of the system communicate via a data/control bus 118.

The instructions 106 include an image preprocessor 120, OCR system 12, text image representation component 16, text string representation component 20, comparison component 24, an information output component 122, and a training component 124. These components are best understood with respect to the method described with reference to FIG. 3. In some embodiments, one or more of these components may be called on by the system from a remote location. For example, the OCR system 12 may be located remotely from computer 112, receive the image 10 as input from the system, or directly from an external source, and return to the system a candidate string 14 (or two or more candidate strings and associated confidence scores).

The information output component 122 outputs information 102 generated by the system. Various forms of information 102 may be output based on the computed confidence (similarity) measure and which may depend on the end use of the system 100. In one embodiment, the information may include a character string 14 that is predicted to correspond to the text image 10, which can be output by the system 100 when the similarity measure meets a threshold value 126. In another embodiment, the most similar character string 14 from a set of possible strings may be output. In yet another embodiment, the information 102 that is output may include a notification that the confidence in the OCR output is not sufficient for a character string 14 to be output. This may be accompanied by a request that the image 10 be reviewed by a human annotator.

The exemplary system 100 may be configured for receiving as input one or more images 128, which in the illustrated embodiment are images of vehicles acquired by an image capture device 130, such as a camera. The image preprocessing component 120 serves as a license plate recognition component which locates a most likely region of the image for the license plate and crops the extraneous content out of the image 128 to form the text image 10. In some embodiments, this function is performed by the OCR system 12. In yet other embodiments, the system 100 may receive, as input, preprocessed text images 10, formed by localizing the text content in the image 128. Methods for localizing an object of interest, such as a license plate, in a larger image are described, for example, in U.S. application Ser. No. 13/351,038, incorporated by reference.

The system 100, via input device 114, may be communicatively connected with the image capture device 130 or with one or more intermediate computer-implemented image processing systems (not shown) via a wired or wireless connection 134, such as a local area network or a wide area network, such as the Internet.

Optionally, a set 136 of the previously seen text images 10, annotated with their respective recognized text strings 14, may be stored by the system 100, to use for verification purposes.

For training the system 100, a training image collection 140 comprising a number of text images analogous to text images 10, such as at least two or at least five, or at least ten, or at least a hundred training images, may be acquired and stored in memory 110 of the system or in remote memory that is accessible to the system. These training images may be annotated with labels corresponding to the ground truth—the actual text in the image, to be used by a training component 124 for training the system 100, specifically, for learning fixed parameters of the comparison function, such as matrix W. In other embodiments, W may be learned separately and input to the system.

The input/output device 116 may communicate via a wired or wireless link 142, with one or more client devices 144. Client device 144 includes a display device 146, such as an LCD screen, computer monitor, or the like, which displays a graphical user interface 148 for a human annotator to edit a candidate text string 14 when prompted by the system 100, for example, when the computed confidence is low. The client device 144 may include a user input device 150, such as a keyboard or touch or writable screen, and/or a cursor control device, such as mouse, trackball, or the like, for inputting text and for communicating user input information and command selections to the processor 104. In other embodiments, display device 146 and user input device 150 may be directly linked to the computer 112, by a wired or wireless connection analogous to link 136.

The computer 112 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 108, 110 may represent any type of non-transitory computer readable medium such as random access memory (RAM), read only memory (ROM), magnetic disk or tape, optical disk, flash memory, or holographic memory. In one embodiment, the memory 108, 110 comprises a combination of random access memory and read only memory. In some embodiments, the processor 104 and memory 108 and/or 110 may be combined in a single chip. The network interface 114, 116 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 104 can be variously embodied, such as by a single-core processor, a dual-core processor (or more generally by a multiple-core processor), a digital processor and cooperating math coprocessor, a digital controller, or the like. The digital processor 104, in addition to controlling the operation of the computer 112, executes instructions stored in memory 108 for performing the method outlined in one or more of FIGS. 3-6.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 100. Since the configuration and operation of programmable computers are well known, they will not be described further.

Images 10 and/or 128 may be received by the system 100 in any convenient file format, such as JPEG, GIF, JBIG, BMP, TIFF, or the like or other common file format used for images and which may optionally be converted to another suitable format prior to processing. Input images may be stored in data memory 110 during processing. Images 10, 128 can be input from any suitable image source, such as a workstation, database, memory storage device, such as a disk, image capture device, or the like. In general, each input digital image includes image data for an array of pixels forming the image. The images may be individual images, such as photographs, video images, or combined images, or the like. In general each image 10, 128 may be a digital photograph expected to include a text region in which characters of a text string are visible as a set of pixels of the image. The image data of the image may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may be used for black and white (monochrome) images or for images which have been converted to monochrome for convenient processing.

Figure 3:
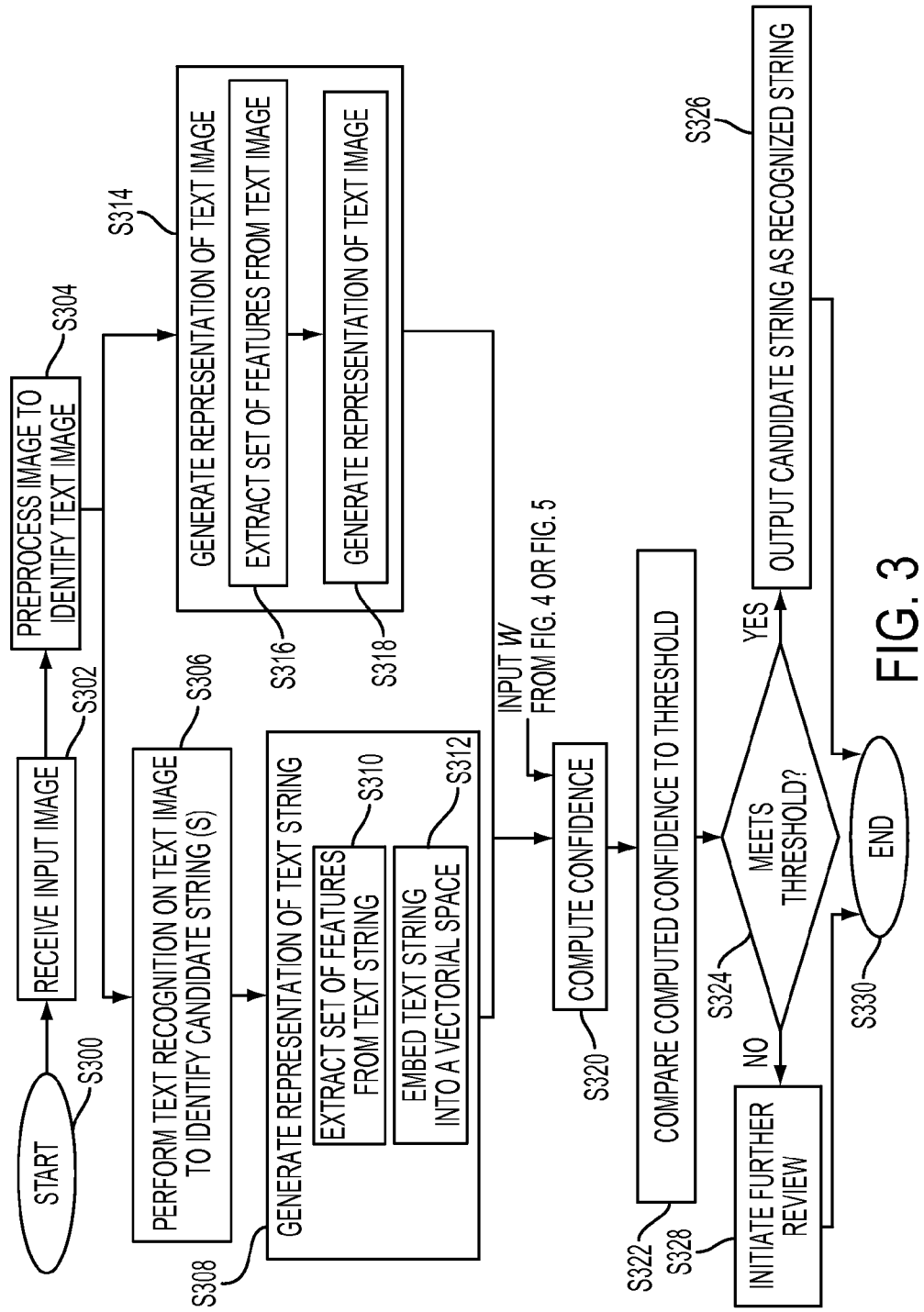
FIG. 3 is a flow chart of a method for OCR output verification.

FIG. 3 illustrates a method for confidence estimation and text recognition which can be performed with the system of FIGS. 1 and 2. The method begins at S300.

At S302, an input image 10, 128 expected to contain a text string is received.

At S304, the input image 128 may be preprocessed to identify a text image 10, e.g., by image preprocessor 120 or by OCR system 12.

At S306, text recognition is performed on the text image 10 to identify at least one candidate string 14, by the OCR system 12. The text string 14 is received and stored in memory 110.

At S308, a text string representation 22 is generated of each candidate text string 14 by the text representation component 20, and stored in memory 110. S308 may include extracting features from the text string (S310), and generating a vectorial representation 18, e.g., in Euclidian space, based on the extracted features (S312).

At S314, an image representation 18 is generated, by the image representation component 16, based on the image 10, and stored in memory 110. This step may include extracting features from the image 10 (S316) and generating a vectorial image representation 18 of the image based on the extracted features (S318).

At S320, confidence is computed as a function of similarity between the text image representation and text string representation in a suitable subspace, e.g., using a bilinear form. In particular, the two multidimensional representations 18, 22 are compared by the comparison component 24 to generate a comparison measure, such as a similarity score, which is stored in memory 110. The comparison may be made in a common subspace by embedding one or both of the two representations in the subspace, e.g.: (i) by projecting x(I) with the matrix $W^T$, (ii) by projecting e(t) with W), or (iii) by projecting x(I) with U and e(t) with V in the case of $W=U^TV$. In one embodiment, the parameters of an embedding function, such as elements of matrix W, may have been previously learned using actual labels of labeled test images to provide a comparison measure that is more likely to yield a more accurate measure of similarity for the label and image, as described with reference to FIGS. 4 and/or 5. The embedding and comparison of the embedded representations can be performed in a single step with a single embedding/comparison function which takes as input the two representations 18, 22, as described in Eqn. 1 above. In other embodiments, the embedding and comparison of the embedded representations can be performed as separate steps.

At S322, the similarity score, or a confidence measure, based thereon may be compared with a threshold confidence measure (similarity score) by the comparison component 24, to determine whether the tentative text string 14 meets or exceed the threshold confidence for image 10. If at S324, the threshold is at least met ($c(I,t) \geq T$), then at S326, the candidate string 14 may be output as the recognized string, such as the license plate number, corresponding to the image of the license plate 10. If the confidence threshold is not met ($c(I,t) < T$), then at S328, a further review may be initiated. For example, the image 10 may be sent to a human annotator or subjected to a second automated process, such as another OCR system. In one embodiment, the second OCR system may generate a candidate text string as for S306, and the steps S308 and S320 to S324 repeated, as before. The method ends at S330.

Further details of the system and method will now be described.

Image Preprocessing (S304)

Methods for localizing an object of interest, such as a license plate, in a larger image are described, for example, in U.S. application Ser. No. 13/351,038 and Ser. No. 13/592,961 (the '961 application). These methods use a set of stored annotated images to identify a similar image or images to a query image to be segmented and then apply the annotations (such as location of a rectangular block encompassing a license plate number) to the query image. The '961 application uses a two stage approach which refines an initial localization using a second set of images that are more focused on the object of interest.

Other segmentation techniques which may be used are based on heuristics which exploit the a priori known characteristics of the object to be segmented, such as characteristics of text. For example, some exploit the frequent presence of horizontal and vertical edges. See, for example, Wonder Alves, et al., "Text localization in scene images by morphological filters," in SIBGRAPI, 2009, and Toan Dinh Nguyen, et al., "Tensor voting based text localization in natural scene images," *IEEE Signal Processing Letters*, 17, Jul. 2010. Others rely on high local contrast or constant stroke width. See, for example, Paolo Comelli, et al., "Optical recognition of motor vehicle license plates." *IEEE Trans. on VT*, 44, November 1995; Boris Epshtein, et al., "Detecting text in natural scenes with stroke width transform," in *CVPR*, Pages 2963-2970, 2010.

As noted above, the OCR system 12 can also be used to identify a text image by segmenting a larger image into words (or other text strings), based on such information as inter-word and inter-line spacing. In the case of license plate images, the OCR system may be trained to ignore small spaces or dashes between parts of the license plate number so that the identified text image may include such spacers between parts of the text string.

Input Image Embedding x(I) (S314)

In one embodiment, the function $I \rightarrow x(I)$ takes an input an image I and outputs a fixed-length vectorial representation 16 of the image 10 in a D-dimensional space. Suitable image representations can be based on (i) the extraction of patch descriptors, (ii) the computation of per-patch statistics based on these descriptors, and (iii) the aggregation of these statistics to generate an image-level representation 18. In the Example below, the Fisher vector representation of Perronnin, et al., "Improving the fisher kernel for large-scale image classification," ECCV 2010, is employed, but other image representations may be used such as the bag-of-visual-words of Csurka et al., Visual Categorization with Bags of Keypoints, ECCV Workshop, 2004.

In general, the embedding of the image in a D-dimensional space involves extracting descriptors from patches of the image such as a set of color and/or gradient features, and analogously for the training images 140. Each patch is composed of a set of pixels. The patches can be at multiple scales such that some patches are overlapping. Statistics are computed for each patch based on the descriptors. The patch statistics can be computed, for example, using the Fisher Vector (FV) principle: it is assumed that a generative model of patches exists (such as a Gaussian Mixture Model (GMM)) and the gradient of the log-likelihood of the patch descriptor is measured with respect to the parameters of the model. The Gaussian mixture model includes a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., F. Perronnin, et al., "Improving the Fisher kernel for large-scale image classification," in ECCV, Part IV, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any license plate image if the range of interest is license plates). A Fisher Kernel representation can be generated by aggregation of the Fisher vectors.

To include spatial information about the text image, the image can be partitioned into regions, the per-patch statistics aggregated at a region level, and then the region-level representations concatenated to form the image representation. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

The exemplary image representations 18 are of a fixed dimensionality, i.e., each image representation has the same number of elements. In general, each image representation has at least 30, or at least 60, or at least 100, or at least 500 dimensions, and up to 1000 or more dimensions, each dimension having a respective feature value, which may be reduced to fewer dimensions.

In one embodiment, the representation component 16 includes a patch extractor, which extracts and analyzes low level visual features of patches of the image 10, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50 patches are extracted from each image. Each patch may comprise at least 40 or at least 100 pixels, and up to 1,000,000 pixels or more.

The extracted low level features (e.g., in the form of a local descriptor, such as a vector or histogram) from each patch can be concatenated and optionally reduced in dimensionality, to form a feature vector which serves as the global image representation. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., features of characters, such as straight lines, curved lines, etc.), characteristic background (e.g., light or dark surface, etc.), or the like. Given an image 10 to be assigned a representation, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image representation or input to a generative model which outputs an image representation based thereon.

In an exemplary embodiment, the low-level features include gradient features, such as SIFT descriptors, one per patch. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales. The dimensionality of these descriptors can be reduced from 128 to 32 dimensions. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. Representations can be computed for two or more regions of the image and aggregated, e.g., concatenated. In the examples below, a visual vocabulary of 64 Gaussians is used in the GMM and only the gradient with respect to the mean parameters is considered. The text image 10 is split into 4 regions (4 vertical stripes). This results in a 32×64×4=8,192-dimensional FV representation.

The representations may be indexed or compressed using conventional techniques (locality sensitive hashing (LSH), product quantization, principal component analysis (PCA), etc.) to speed up the process.

Other exemplary methods for computing image representations are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

While the exemplary method considers license plate or other images in which the sequence of characters forms a single row, it is also the case that character strings may be split over two or more rows. In one embodiment, such an image may be segmented into rows and the rows concatenated to form a single row image. In other embodiments, an image is segmented into words and each word is considered as a separate sequence of characters.

Text Embedding e(t) (S308)

The function t→e(t) takes as input a text string 14 and outputs a fixed-length vectorial representation of the string. The number of dimensions of e(t) is independent of the string length (number of characters) in an E-dimensional space. Two methods are provided by way of illustration.

A. Synthesized Image

In this embodiment, the text embedding t→e(t) is performed by synthesizing a word image from the text string using a computer-generated font, extracting features from this synthesized image, and generating an E-dimensional representation 22 based on the extracted features. The word image may be in the form of an array of pixels, such as a monochrome image which may be a binary image (all pixels black or white) or a greyscale image, where pixels can also have intermediate values in one or more color channels. Additional information may be used as input to the word image synthesizer, depending on the application. As examples:

1. In the context of a general purpose OCR system 12, the OCR not only outputs the candidate text string 14 but also generally the recognized font from a predefined set of computer-generated fonts. This font information may be used to synthesize a word image which is more consistent with the input image I.

2. In the context of a license plate recognition (LPR) system, the LPR OCR software not only outputs the candidate license plate number 14 but also may output the recognized state of issuance and in some cases, the plate type (for example, the fact that the plate contains a "handicapped" sign). This plate type information may be used to synthesize a plate image which is more consistent with the input plate image. The system may store standardized representations of license plate backgrounds for each of the states as well as appropriate logos for specialized plates, such as handicap signs.

See, for example, U.S. application Ser. No. 13/300,124 and Ser. No. 13/458,464 for more details on the synthesis of license plate images based on OCR recognized information.

In one embodiment the synthesized word image (plate) generated by this method could be used directly as text embedding e(t), i.e., each pixel is a feature in the vectorial representation. In the exemplary embodiment, however, a fixed-dimension, feature based representation is generated. For example, patch level features and Fisher Vectors are computed on the synthesized images, in the same manner as for the image representation generation. In this case, the expectation is that if the text (and font, state, etc.) is correctly recognized, the synthesized image should be very similar to the query image. In this case the matrix W is imposing a metric to map the "real image" domain to the "synthetic image" domain (since they still can have different distributions).

An advantage of this embodiment is that it enables side information, such as the font or the license plate type, to be taken into account.

B. Bag of Characters Representation

In this embodiment, the text embedding function t→e(t) is performed by computing statistics about the frequency of occurrence of the characters as well as their positions in the string 14 to generate an E-dimensional representation 22. One suitable text representation is the Spatial Pyramid Bag-Of-Characters (SPBOC), as described, for example, proposed in the '014 application.

One advantage of this embodiment is that the SPBOC is very fast to compute and much simpler to implement as it does not require any complex image synthesis software. In the Example below, the SPBOC method is used to generate the text representation.

In the SPBOC method, the text string is composed of characters in a finite set $\mathcal{L}$ of characters of size L. For example, for a license plate recognition method, the set $\mathcal{L}$ of possible characters may be the set of possible letters A-Z in the alphabet and the numbers 0-9, i.e., a total of 36 different characters. As will be appreciated, other characters may be considered depending on the application or the target language. Special characters may also be considered such as a space amounting to at least a predefined gap between two characters.

The words could simply be embedded into an L-dimensional space by counting the number of occurrences of each character. Such a representation would correspond to a bag-of-characters (BOC). However, this representation does not take into account the order of the letters. Therefore, two strings can have the same representation if they include the same subset of the characters in the alphabet.

In the SPBOC, the string of characters is successively partitioned into regions and a presentation of each region is generated based on the characters and portions of characters that it contains. The region-based representations can then be aggregated. In this way, since the same number of regions is created, independent of the number of characters, the final representation, e.g., generated by concatenation of the region representations, is of a fixed length. As an example, given the candidate string ABCDE, the full string is considered one region for a first level and the representation of this region has a value 1 for each of the letters in the string since none is repeated. Subdividing this region into three regions at a second level (assuming each character is accorded the same width, generates three regions with features corresponding to [A,⅔B], [⅓B,C,⅓D], and [⅔D,E] respectively. Each of the regions can be further partitioned in a third level (giving 9 regions), and the partitioning repeated, for example, to generate 4 or 5 spatial levels, each level (apart from the first) being formed by partitioning the region(s) in the previous (higher) level. The partitioning is performed perpendicular to the direction of the text. As will be appreciated, the partitioning may be into two regions rather than three at the second and successive levels, or different levels may use different extents of partitioning.

The number of characters in each region is then counted to generate a BOC. The BOC may be a vector having an element for each character in the set of characters, each element having a value which is based on the number of occurrences of that character in the respective region. Such a histogram representation may then subsequently normalized, using, for example the $l_1$ norm or the $l_2$ norm (or any $l_p$ normalization technique). For example, the counts are normalized so that the elements of the vector sum to 1 or the square root of the sum of their squares=1.

Then, the BOC representations corresponding to each region and each level are concatenated. This representation is referred to herein as a Spatial Pyramid BOC (SPBOC).

The number of levels may be at least 2, or at least 3, or at least 4. In one embodiment, 5 levels may be employed, and this may generate up to 32×(1+2+4+8+16)=1,116-dimensional SPBOC representations, where 32 characters are considered and each region is subdivided into two at the next level. The histogram representations are $l_1$-normalized. An advantage of this representation is that it is typically sparse and therefore can be stored in an efficient manner.

As will be appreciated, other techniques may be employed to embed ASCII words into a Euclidean space.

Confidence Score Computation (S320)

In general, the image 10 and text string 14 are embedded in different spaces and are therefore are not readily comparable using simple metrics, such as the Euclidean distance.

In the exemplary embodiment, a D×E matrix W is used to project the text representation e(t) into a common space of image representations (or vice versa with an E×D matrix), where D represents the number of elements in each text string representation and E represents the number of elements in each image representation. The projected text embedding W·e(t) can then be compared with the image embedding x(I) using the dot-product, i.e., by computing:

$$c(t,I) = x(I)^T \cdot W \cdot e(t).$$

This is strictly equivalent to projecting the image embedding x(I) in the space of text embeddings and then using the dot-product between $x(I)^T \cdot W$ and e(t).

In another embodiment, both x(I) and e(t) are projected in a common lower-dimensional space. This is especially advantageous when the size of the embedding spaces D and E are large, i.e., when the matrix W is large. In such a case, W can be expressed as a product of low-rank matrices, i.e., W=U'V with U being a K×D matrix and V a K×E matrix where K<min(D,E). The advantage of this approach is that the number of parameters to estimate is K(D+E), which is typically much smaller than D×E. Also, once image embeddings and text embeddings have been projected in the lower-dimensional subspace, the similarity computation is very fast.

It will be appreciated that while the dot product is used herein as the similarity measure, any similarity measure suited to computing the similarity between the representations can be used. For example, the Manhattan distance, KL divergence, the Hellinger (HE) divergence, the Renyi divergence, the Euclidean distance, the Mahalanobis distance, the L1 distance, or the chi-squared similarity measure can be used. For example the Euclidean distance, or other similarity measure, could be computed between $x(I)^T$ and We(t) or between $x(I)^T W$ and e(t). See, for example, U.S. Pub. No. 20100191743, published Jul. 29, 2010, by Florent Perronnin, et al., the disclosure of which is incorporated herein by reference in its entirety, for further details on some of these similarity measures.

The similarity measure computed by Eqn. 1 is a scalar value. It may be used directly as the confidence measure, or may be converted to a percentage, a rank, or otherwise processed to compute the confidence measure.

Estimation of the Matrix W

The method of FIG. 3 assumes that parameters of a comparison function have been learned for comparing the two representations. Two methods for computing the matrix W are now described by way of example.

In the following, the terms "optimization," "minimization," and similar phraseology are to be broadly construed as one of ordinary skill in the art would understand these terms.

For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

A. Standard Structured Learning

In this method, the matrix W is learned by building "triplets" of the form (e(t), x+, x−), where e(t) is the representation of a ground-truth label t, x+ is the representation of a text image from the training set that corresponds to label t, and x− is the representation of a text image from the training set that does not correspond to label t. From a set of such triplets, a matrix W can be computed using a structured output learning algorithm, which serves to optimize the likelihood, over all training samples, that the computed confidence will be higher, in each triplet, for the true image than for the image that does not correspond to the label t.

This method can be implemented as described in the '014 application.

Figure 4:
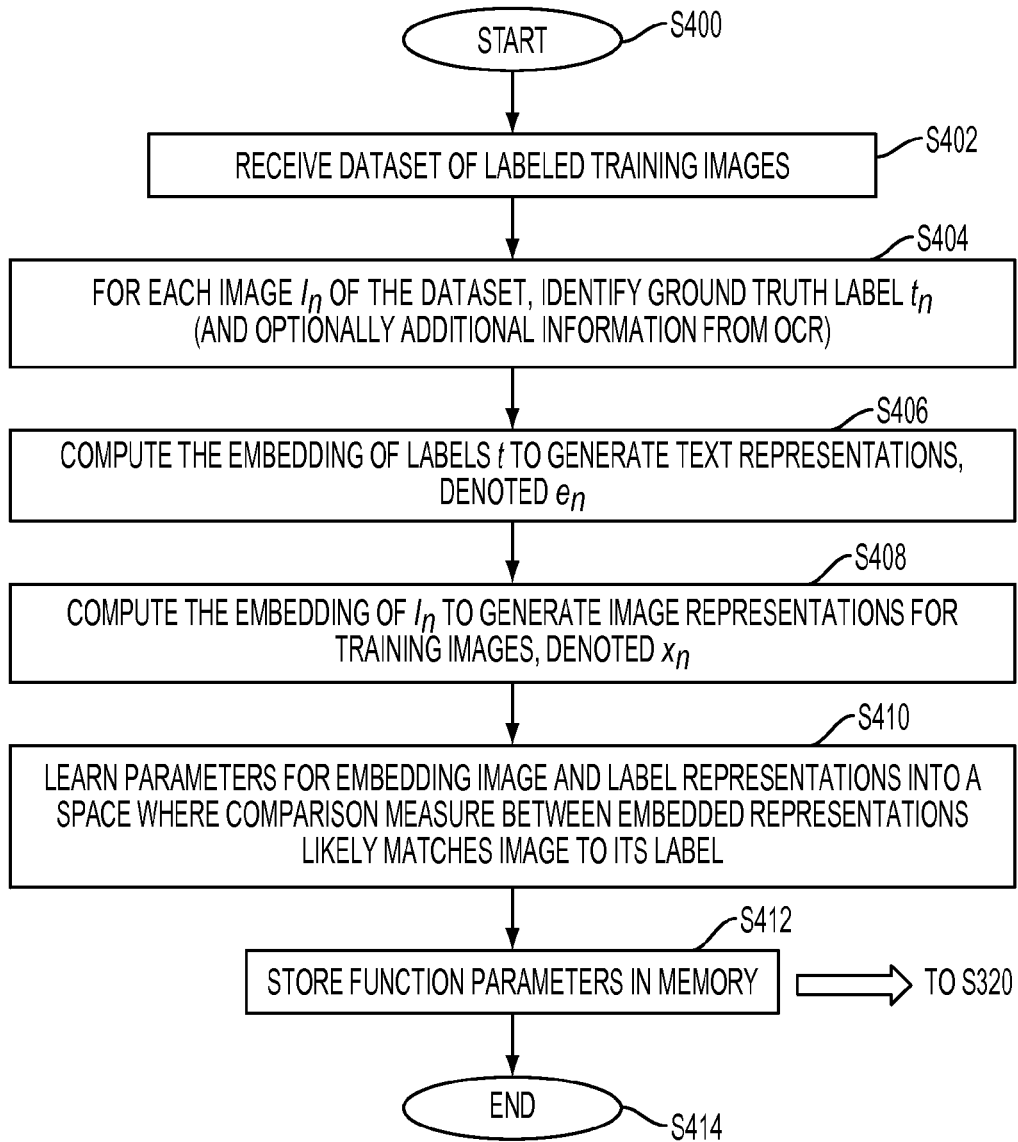
FIG. 4 is a flow chart illustrating learning parameters of a confidence function for use in the system and method of FIGS. 2 and 3 in accordance with one embodiment.

FIG. 4 illustrates the example method for learning the comparison function. The method may be implemented by the training component 124 of the system 100, which calls on other components previously described, or may be performed on a separate computing device.

The method begins at S400.

At S402 a set 140 of training images, each similar to image 10, is received (images in set 140 may have been preprocessed as for S304). Each training image $I_n$ in the dataset has a manually assigned (ground truth) label t which is the character string that a human reviewer has recognized in the image, such as the sequence of letters and numbers forming a license plate number. The character string (label) consists of a sequence of characters selected from the finite set of characters.

At S404, text recognition is optionally performed on each training image in the set 140 to identify a respective candidate string 14, and optionally associated information such as font information, by the OCR system 12. The OCR output is compared with the ground truth label to make sure it matches. In another embodiment, the ground truth label can be taken as t, without performing OCR, in the case where the text representation component uses only the text string and no additional information.

At S406 a representation $e_n$ of each text string 14 is generated, as for S308.

At S408, an image representation $x_n$ is generated for each training image $I_n$ with image representation component 16, in the same manner as for the test image 10, e.g., using Fisher vectors, as described for S314.

At S410, embedding parameters, such as weights w of the matrix W, are learned for embedding one or both of the image and text string representations in a space in which the image representation is more likely to be most similar to a corresponding correct OCR string than to other label representations, or vice versa. This ensures that matching image/character string pairs rank higher, based on the confidence score, than non-matching pairs. The optimization of the weights over all possible samples from the training set can be computationally expensive. Accordingly, the weights can be optimized by progressively sampling from the training set and updating weights in the matrix at each iteration. The matrix of weights W can be learned, for example, using stochastic gradient descent, or other structured output prediction learning methods. In particular a matrix W of weights w is initialized and the values in the matrix are progressively refined. For the initialization of weights w, the parameters of the matrix may be randomly sampled from a normal distribution, e.g., divided by the dimensionality of the image feature vectors.

The learning can be performed by updating the weights when a triplet is drawn for which the similarity between the representation x− of a text image that does not correspond to the label t is more similar to e(t) than the representation x+ of the image that does correspond to label t. A learning rate can be selected to change the degree to which the parameters are updated, as described, for example, the '014 application.

At S412, the learned parameters are stored in memory, such as memory 110. The method ends at S414 and/or may proceed to S320 of FIG. 3.

B. Adapted Method

Figure 5:
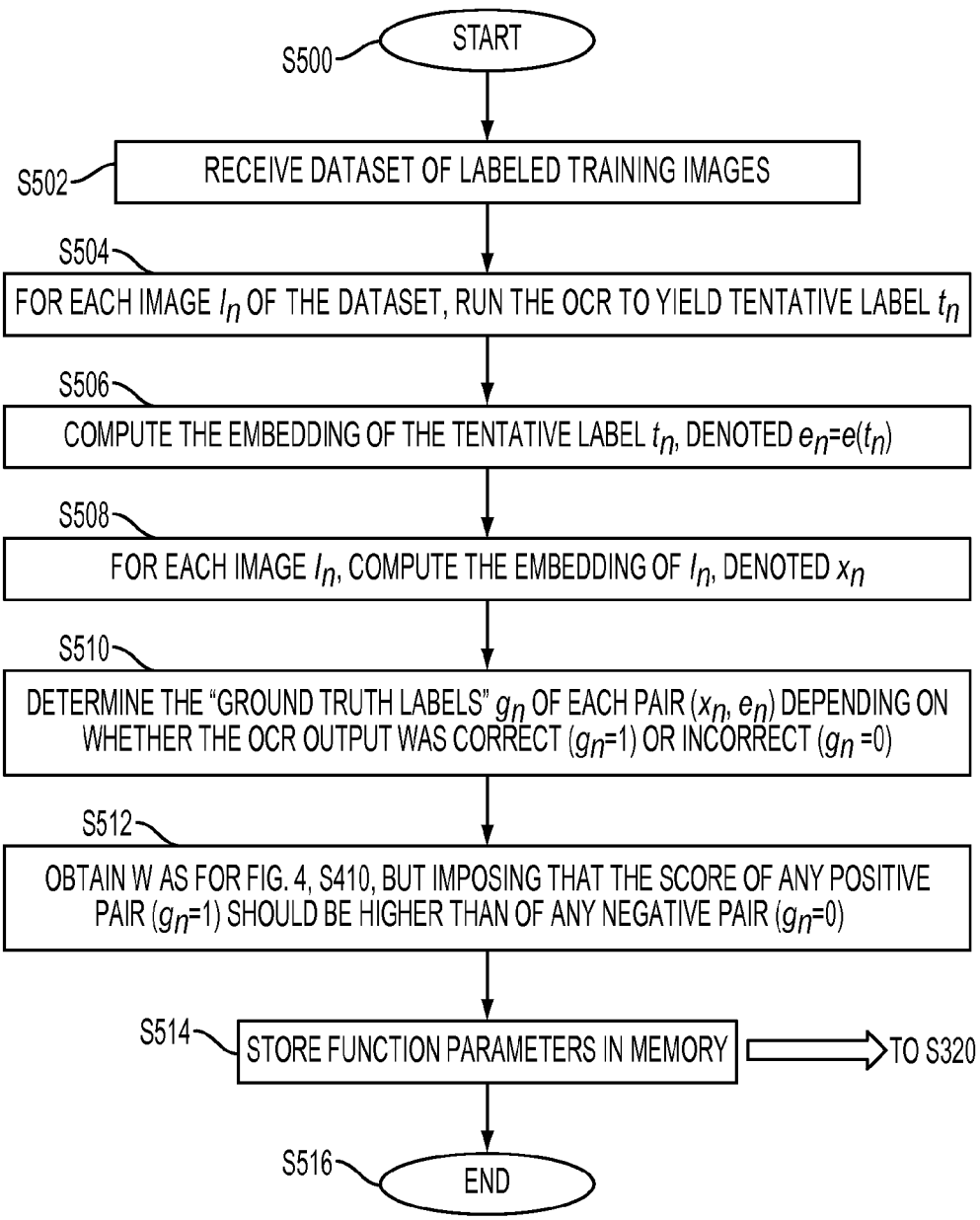
FIG. 5 is a flow chart illustrating learning parameters of a confidence function for use in the system and method of FIGS. 2 and 3 in accordance with another embodiment.

An alternative approach to learning W, which is tailored for the problem of OCR verification, may be performed as illustrated in FIG. 5:

The method begins at S500.

At S502 a set 140 of training images, each similar to image 10, is received (images in set 140 may have been preprocessed as for S304).

At S504, for each image $I_n$ of the dataset 140 of training images, text recognition is performed by running the OCR system 12 to yield a respective tentative label $t_n$.

At S506, the embedding is computed of the tentative label $t_n$, denoted $e_n = e(t_n)$, as for S406.

At S508, the embedding is computed of $I_n$, denoted $x_n$, as for S408.

At S510, the ground truth label $g_n$ of each pair $(x_n, e_n)$ is determined, depending on whether the OCR output was correct ($g_n = 1$) or incorrect ($g_n = 0$).

At S512, W is learned, similarly to the '014 application and S410, but imposing that the confidence score of any positive pair ($g_n = 1$) should be higher than of any negative pair ($g_n = 0$), otherwise the weights are updated.

This algorithm is thus similar to that of FIG. 4 but uses, as negative samples, the incorrect OCR outputs, which are expected to be much closer to the true label for a text image than a randomly drawn pair. The method of FIG. 5 is also relatively specific to the OCR system used to output the text image, since OCR systems often make consistent errors, which are factored into matrix W.

The learning algorithm of FIG. 5 based on pairs is well suited to the OCR verification scenario. However, training with random triplets as for the method of FIG. 4 is also contemplated.

Output of Information (S328, S326)

As will be appreciated, the system may output other information in addition to or in place of the confidence score, recognized text string, or the like. For example, the system may output information for debiting the account of the owner of the vehicle having the license plate number for toll or parking charges, depending on the application. The system may also be used as a recognition system to find a match for a given text image, such as a license plate image, in a database of text strings, such as license plate numbers. In this case, the information output may be a closest matching one (or more) of the license plate numbers from the database, or information based thereon, such as information about the owner of the vehicle, the location of the vehicle at a given time, for example the location of the camera which captured the license plate image, or that there is a vehicle in a location, such as a parking garage, with a license plate which matches the recognized text string. In the case where the method is used for retrieval, e.g., to find a match for a given image, in a database of text images, such as license plate images, the information output may be a closest matching one (or more) of the license plate images from the database based on the respective recognized text strings.

Re-Ranking Lists

In one embodiment, the OCR system 12 outputs a ranked list of K strings $t_k$ together with respective confidences $o(t_k)$, rather than a single candidate string and its confidence, where K is at least 2, such as from 2-10.

The exemplary method can then be used to compute a new confidence (via label embedding) for the kth candidate as:

$$c(I, t_k) = x(I)^T We(t_k)$$

The list of K strings $t_k$ is then re-ranked, based on the values of $c(I, t_k)$. This approach can be considered as "OCR correction" as the aim is to re-rank the candidate strings so that if the correct candidate is within the K elements, then it has a chance to be promoted to the top. Accordingly, this method takes into account the confidence of the OCR system as well as that output by the exemplary component 24. The method may output the top most ranked text string (based on the confidence scores) in the list K.

Other Embodiments

Figure 6:
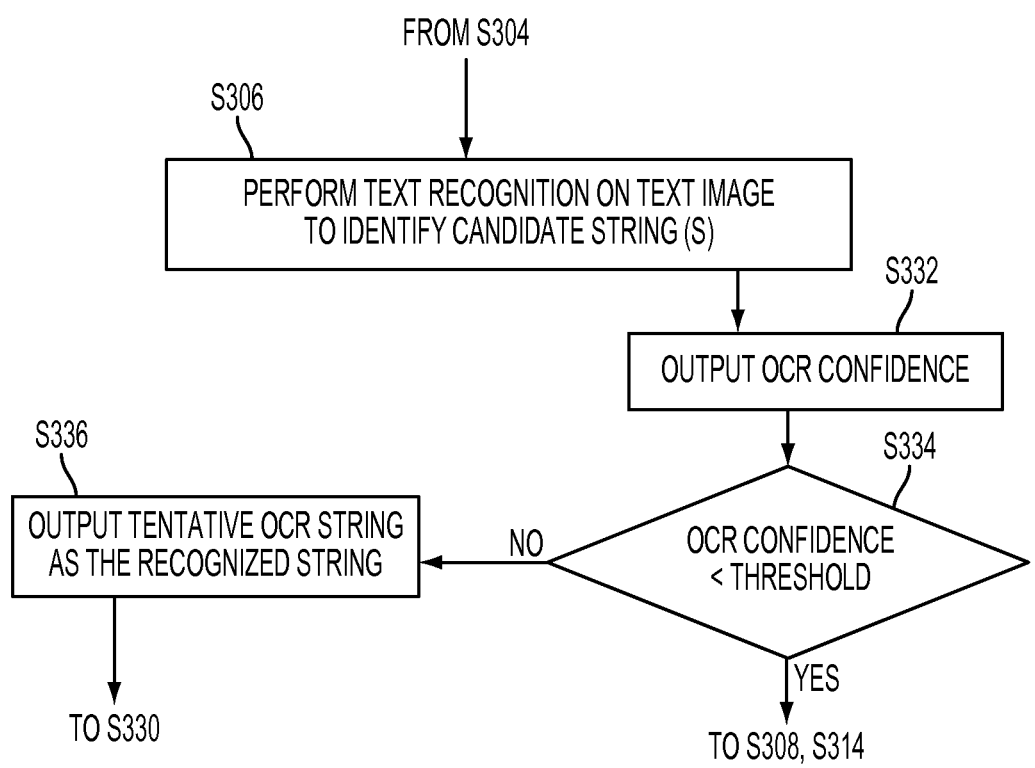
FIG. 6 illustrates an adaptation to the method of FIG. 3.

In one embodiment, the exemplary method is performed only when the confidence 28 computed by the OCR system 12 is below a predetermined threshold. For example, as illustrated in FIG. 6, the method of FIG. 3 may be modified with intermediate steps of outputting the OCR confidence (S3332) and determining whether the confidence is below a predetermined threshold (S334). If so, the method proceeds to S308 and S314 of FIG. 3 (the rest of the method is omitted from FIG. 6 for clarity). Otherwise, the string 14 identified by the OCR system is output at S336, and the method terminates, without proceeding through the exemplary confidence estimation method of S322.

In another embodiment, the object which is the subject of the image I may have already been seen before. For example, a vehicle using an automated toll payment system may have had images of its license plate captured at several toll booths, which may be stored in memory together with a recognized license plate number (collection 136 in FIG. 1). These can be used to assist in cases where a confidence c(t,I) in an OCR string for a current image is below a threshold.

As an example, step S328 of the method shown in FIG. 3 may proceed as follows: If the confidence at S324 is below the threshold, a signature matching component (not shown) of the system 100 runs a nearest-neighbor search in which the plate image 10 is compared against the set of previously annotated images 136. This can be performed by computing a similarity between the image representation 18 of the current image 10 and corresponding image representations of the previously acquired images in set 136 to find the nearest neighbor (most similar image, e.g. using Euclidian distance or dot product as the measure of similarity). If the similarity between the two image representations meets a predetermined image similarity threshold, the two images are assumed to be of the same license plate and the license plate number associated with the existing image in collection 136 is assigned to the current image. If, on the other hand, the signature matching algorithm does not find a match with enough confidence, the current plate image may be sent to a human operator for manual review, or for other processing.

As will be appreciated, this method may also be combined with the adaptation shown in FIG. 6.

In some embodiments, each time a new license plate number is identified by the OCR system 12 that has not previously been observed by the toll collection system, the corresponding acquired image 10 is automatically sent for manual verification and the acquired image is stored in database 136 for future reference.

The method illustrated in any one or more of FIGS. 3, 4, 5 and 6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in any one or more of FIGS. 3, 4, 5, and 6 can be used to implement the method.

As will be appreciated, the steps of the method(s) need not all proceed in the order illustrated and fewer, more, or different steps may be performed.

The exemplary method finds application in tolls or parking facilities that require the automatic identification of vehicles. This is done with third-party solutions as well as with the internal Xerox License Plate recognition (XLPR) software. We show in the experimental section that the proposed method can reduce both the false rejection/false accept characteristic with respect to the third-party OCR used by TCLG.

Without intending to limit the scope of the exemplary embodiment, the following Examples demonstrate the applicability of the method to license plate recognition.

EXAMPLE

The exemplary method was evaluated in the context of an electronic tolling application using real data obtained. Specifically, a dataset of 21,497 images 10 corresponding to a week of tolling data was acquired. This batch of images was obtained using an image capture configuration which has not been fine-tuned to ease the OCR output (as is usually the case in license plate recognition systems), and therefore constitutes a challenging set. The images, which were extracted from larger images using automated license plate recognition techniques, are fed to a commercial OCR system for license plate recognition, denoted SOTA, which outputs a candidate license plate number, as well as a confidence score for the string.

The data was randomly split in two halves; one was used for training and one for testing. For the experiments, Fisher vectors were used for image embedding and the spatial pyramid bag of characters (SPBOC) for text embedding. Matrix W was learned using the Standard Structured Learning method, described above. For this method, triplets of (image, correct text, and random incorrect text) were considered, where "random incorrect text" denotes a randomly chosen label from the training set. Optimization was performed using stochastic gradient descent. For these experiments, a "full" matrix W is used, of dimensions D×E, where D=8,192 is the size of the Fisher vectors, and E=1,116 is the size of the SPBOC (using 36 characters and 5 levels). Once W is generated on the training set, the confidence scores c(t,I) can be computed for each image in the testing set, as described above.

Figure 7:
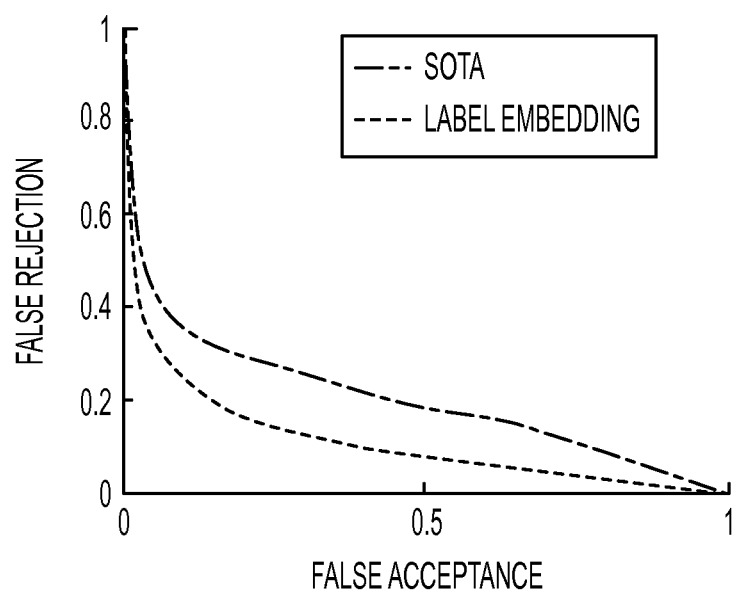
FIG. 7 is a plot of experimental results of a confidence estimation experiment using the exemplary method.

To evaluate the performance of the method, and compare it with that of the SOTA confidence scores, the False rejection (FR) vs. False acceptance (FA) characteristic of the exemplary method and of the confidence score output by SOTA are plotted. For each possible threshold, a count is made of the fraction of correct recognition results with confidence<threshold (FR), and the fraction of incorrectly recognized results that have confidence>threshold. The results are shown in FIG. 7.

It can be appreciated that the proposed confidence yields improvements in reducing both the false acceptance and false rejection rates.

By visual inspection, it was noted that the commercial OCR fails to recognize pairs of small characters arranged vertically, such as in $34856_D{}^C$. The stacked characters C and D are often ignored, while still outputting a high OCR-confidence in the number 34856. However, it is not necessary to have access to the internals of the OCR to correct this behavior. Instead, the exemplary method assigns a lower confidence to the number 34856 and this recognition result is rejected.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for computing confidence comprising:
with a text recognition system, performing character recognition on an input text image to generate a candidate string of characters;
generating a first representation based on the candidate string of characters, the generating of the first representation comprising partitioning the candidate character string into a plurality of regions and extracting a representation of each of the regions, the character string representation being derived by aggregating the region representations;
generating a second representation based on the input text image;
computing a confidence in the candidate string of characters based on a computed similarity between the first and second representations in a common embedding space, at least one of the first and second representations being projected into the common embedding space; and
wherein at least one of the performing character recognition, generating the first representation, generating the second representation, and computing the confidence is performed with a computer processor.

2. The method of claim 1, wherein the computed similarity is computed as the dot product of the projected first and second representations.

3. The method of claim 1, wherein the first and second representations comprise multidimensional feature vectors.

4. The method of claim 1, wherein the generating of the first representation comprises embedding the character string into a vectorial space, the embedding comprising extracting a set of features from the character string and generating a character string representation based on the extracted character string features.

5. The method of claim 1, where the embedding comprises generating a spatial pyramid bag of the characters.

6. A method, for computing confidence comprising:
with a text recognition system, performing character recognition on an input text image to generate a candidate string of characters;
generating a first representation based on the candidate string of characters comprising synthesizing a synthetic image of the candidate string of characters generated by the character recognition and computing a representation based on the synthetic image;
generating a second representation based on the input text image;
computing a confidence in the candidate string of characters based on a computed similarity between the first and second representations in a common embedding space, at least one of the first and second representations being projected into the common embedding space; and
wherein at least one of the performing character recognition, generating the first representation, generating the second representation, and computing the confidence is performed with a computer processor.

7. The method of claim 6, where the synthesizing of the synthetic image comprises at least one of:
representing characters of the character string in a font identified from the input image in the performed character recognition; and,
representing non-textual information extracted from the image.

8. The method of claim 1 wherein the generating of the second representation comprises generating a statistical representation of features extracted from patches of the image using a generative model.

9. The method of claim 1, further comprising learning a projection for projecting the at least one of the first and second representations into the common space, the projection being learned with a structured output prediction algorithm.

10. The method of claim 1, further comprising outputting information based on the computed confidence.

11. The method of claim 10, wherein the outputting of information comprises outputting the candidate string of characters when the computed confidence meets a predetermined confidence threshold.

12. The method of claim 1, wherein the performing character recognition on the input image comprises, with the text recognition system, generating a plurality of candidate strings of characters for the same input text image, the method further comprising ranking the plurality of candidate strings based on the respective computed confidences.

13. The method of claim 12, wherein the generating of the plurality of candidate strings of characters comprises identifying candidate strings based on associated confidence scores output by the text recognition system.

14. The method of claim 1, further comprising comparing the computed confidence to a threshold and when the confidence does not meet the threshold, initiating a further review of the input image.

15. The method of claim 14, wherein the further review comprises at least one of:

performing character recognition on the input text image with a second text recognition system, initiating a manual review of the text image; and computing a similarity between the input text image and a set of stored text images, each annotated with a corresponding character string.

16. The method of claim 1, further comprising computing the similarity between the first and second representations using a function of the form:

$$c(t,I) = x(I)^T \cdot W \cdot e(t) \quad (1)$$

where x(I) represents one of the text image representation and the character string representation, e(t) represents the other of the text image representation and the character string representation, T represents the transpose operator, and W represents a matrix of weights.

17. The method of claim 1, wherein the character string comprises a sequence of characters, each character in the sequence being drawn from a finite set of characters.

18. The method of claim 1, wherein the character string comprises a license plate number and the text image comprises a captured image of a license plate.

19. A computer program product comprising a non-transitory recording medium storing instructions, which when executed on a computer, causes the computer to perform the method of claim 1.

20. A system comprising memory which stores instructions for performing the method of claim 1 and a processor in communication with the memory for executing the instructions.

21. A system for computing confidence comprising:

a text image representation component which generates a text image representation based on features extracted from a text image;

a text string representation component which receives a character string from an associated text recognition system as a candidate string for the text image, synthesizes a word image from the character text string using a computer-generated font and generates a character string representation based on features extracted from the synthesized word image, or partitions the character string into a plurality of regions, extracts a representation of each of the regions, and aggregates the region representations to generate a character string representation;

a comparison component which computes a confidence in the character string based on a similarity between the text image representation and the character string representation in a learned embedding space;

an information output component which outputs information based on the computed confidence; and a processor which implements the text image representation component, text string representation component, comparison component, and information output component.

22. A license plate recognition method comprising:

performing optical character recognition on an image of a license plate to generate a character string as a candidate license plate number;

computing a confidence in the candidate license plate number based on a function which embeds a representation of the license plate image and a representation of the candidate license plate number in an embedding space with a matrix of weights learned on an annotated set of license plate images; and where the confidence meets a threshold, outputting the character string as a recognized license plate number for the image of the license plate, otherwise initiating another process for license plate number recognition;

wherein at least one of the performing, computing and outputting is performed with a processor.

* * * * *